Jan. 28, 1930.  J. McDONOUGH ET AL  1,744,784
FLUX
Filed May 18, 1927
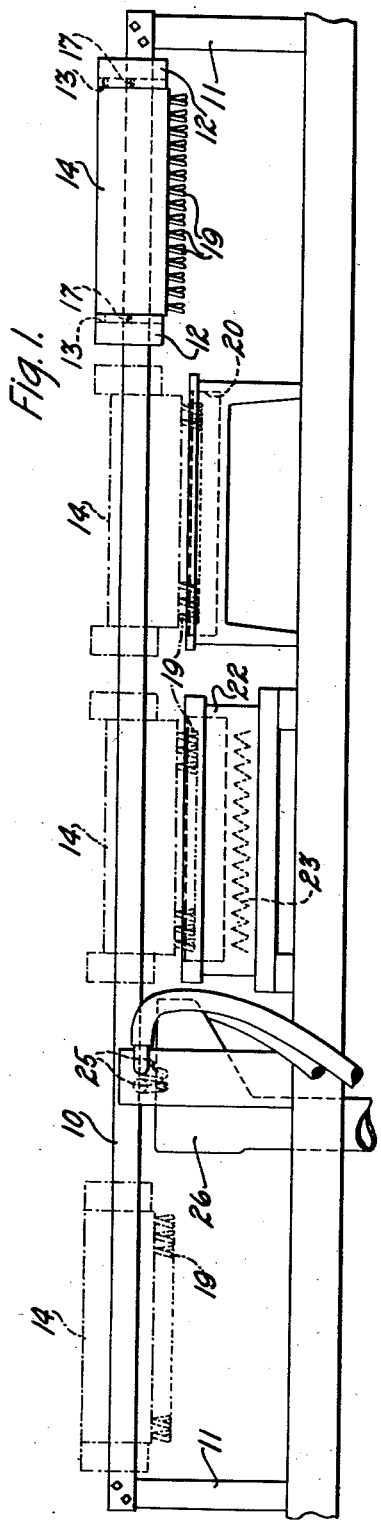
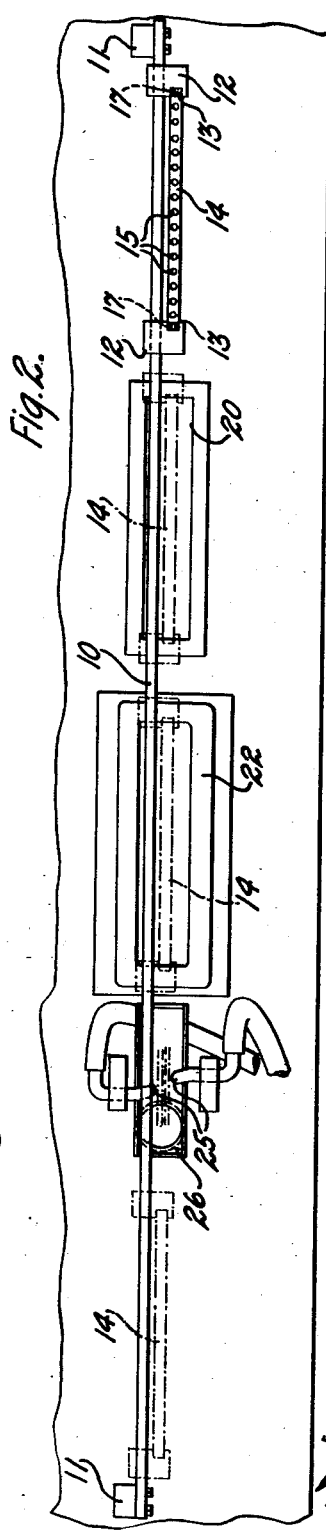
Inventors
John McDonough
Lars Normann Patented Jan. 28, 1930

1,744,784

UNITED STATES PATENT OFFICE

JOHN McDONOUGH AND LARS NORMANN, OF CHICAGO, ILLINOIS, ASSIGNORS TO WESTERN ELECTRIC COMPANY, INCORPORATED, OF NEW YORK, N. Y., A CORPORATION OF NEW YORK

FLUX

Application filed May 18, 1927. Serial No. 192,194.

This invention relates to fluxes, and more particularly to fluxes for use in soldering and metal coating operations.

The object of the invention is to provide an economical and effective flux which may be easily prepared and readily used in soldering and metal coating operations.

In accordance with the general features of the invention, a fluxing material, such as rosin, is dissolved in a solvent, such as carbontetrachloride, and the resulting solution is employed in a metal coating operation in which articles are coated with solder.

The invention will be clearly understood from the following detailed description taken in conjunction with the accompanying drawings, and also other objects and features of the invention will be apparent therefrom and will be specifically pointed out in the annexed claim.

In the drawings,

Fig. 1 is an elevational view of a metal coating apparatus in which the flux embodying the invention may be used, and Fig. 2 is a plan view thereof.

It has been found advantageous in many instances to employ a liquid flux in various kinds of soldering and metal coating operations and many kinds of liquid fluxes have been used in those operations. However, the fluxes ordinarily used require considerable skill and care to be used in order to give satisfactory results when employed upon different kinds of materials, such as iron, tin, brass, copper, etc.

Experiments have shown that a solution of rosin in an organic solvent, such as carbontetrachloride, is an effective flux for cleaning most materials upon which soldering or metal coating operations are performed. One particular composition embodying the invention which gives very satisfactory results consists of a solution of rosin and carbontetrachloride combined in such proportions that the resulting solution will contain .7 pounds of rosin per gallon of carbontetrachloride. Carbontetrachloride is an especially effective solvent to use because of its high solvent power for the rosin itself and for grease, etc., upon the parts being soldered and also because it is non-inflammable.

This composition has proven to be very satisfactory for use as a flux in coating metal parts, such as terminals for electrical apparatus, particularly for "tinning" the terminal portions of jacks which are used in telephone equipment. The accompanying drawing illustrates an apparatus for coating the terminal portions of jacks with a solder having a high tin content in which the flux described above may be used.

In the drawing the numeral 10 designates a rail supported by a plurality of uprights 11—11 upon which a carriage 12 is slidably mounted. The carriage 12 is provided with grooved portions 13—13 in which a framework 14 carrying a plurality of jacks 15—15 may be inserted and in each of the grooves 13—13 is a spring pressed stop member 17 which normally retain the framework 14 in the position shown in full lines in Fig. 1. The framework 14 is provided at its lower side with a plurality of terminals 19—19 upon which a coating of solder is placed by means of the apparatus being described. A short distance from the right hand end of the apparatus as seen in Fig. 1 and directly below the rail 10 is a vessel 20 in which is placed a quantity of the flux described above and into which the terminals 19—19 may be inserted. Immediately to the left of the vessel 20 and directly below the rail 10 is another vessel 22 which is heated in any suitable manner such as by an electrical resistance 23 for the purpose of melting solder placed therein. Immediately to the left of the vessel 22 are a plurality of air nozzles 25—25 which are located in close proximity to the path taken by the carriage 12 when moved along the rail 10 and which are so positioned that a current of air from one of the nozzles will not impinge directly upon a current of air coming from another one of the nozzles. The nozzles 25—25 are partially enclosed by a hood 26 which is connected to an exhaust fan (not shown).

The operation of the apparatus is as follows: A framework 14 is inserted in the carriage 12 in the position shown in full lines in Figs. 1 and 2. The carriage is moved to the left as seen in Fig. 1 until it is directly above the vessel 20 when pressure is applied upon the top of the framework 14 causing it to be lowered against the force of the springs urging the stops 17—17 upwardly until the terminals 19—19 are immersed as shown in dotted lines in Fig. 1 in the flux contained in the vessel 20. The pressure upon the framework 14 is then released and the framework 14 is returned to the position shown in full lines in Fig. 1 by means of the spring pressed stops 17—17 when the carriage is moved still further to the left until it is above the vessel 22 which contains a supply of molten solder having a high tin content and which is maintained at a temperature of approximately 900° F. The framework 14 is again lowered until the terminals 19—19 are immersed in the molten solder contained in the vessel 22. The framework is then allowed to resume its original position and the carriage 12 is moved to the extreme left in the position shown in dotted lines in Fig. 1. In so doing the terminals 19—19 which have just emerged from the tinning bath are carried past the air nozzles 25—25 through which blasts of heated air are forced for the purpose of blowing excess solder from the terminals 19—19 into the hood 26 where the solder is collected until a sufficient amount is obtained when it is placed in the vessel 22 and used again. The framework 14 carrying the tinned terminals is removed from the carriage 12, the carriage is returned to its original position at the extreme right hand side of the apparatus as seen in Fig. 1, another framework 14 is inserted in the carriage 12 and the above operation is repeated.

It will be readily seen that a liquid flux of the type described above is particularly adapted to be used in a metal coating apparatus such as that just described and since the flux itself is very effective in cleaning surfaces upon which a coating of metal as solder is to be placed, very satisfactory results will be obtained by its use.

It is of course to be understood that the invention is not limited to the exact ingredients given in the specific example hereinbefore described nor to those ingredients in the exact proportions given in that example, but the invention is to be limited only by the scope of the appended claim. For example, solvents other than carbontetrachloride may be used to dissolve the rosin. Among the solvents which may be used with satisfactory results are methyl alcohol, ethyl alcohol, acetone, ethyl acetate, etc. Also the flux is not limited to its use with the particular apparatus hereinbefore described nor is it limited in its use to metal tinning operations. It may be employed in various metal coating and soldering operations where an effective flux which may be readily applied is desired.

What is claimed is:

A flux comprising a solution of rosin in carbontetrachloride in the proportion of .7 pounds of rosin per gallon of carbontetrachloride.

In witness whereof, we hereunto subscribe our names this 28 day of April A. D., 1927.

JOHN McDONOUGH.
LARS NORMANN.